US010404782B2

(12) United States Patent
Choi et al.

(10) Patent No.: US 10,404,782 B2
(45) Date of Patent: Sep. 3, 2019

(54) APPARATUS AND METHOD FOR RECONSTRUCTING TRANSMITTED FILE IN REAL TIME FOR BROADBAND NETWORK ENVIRONMENT

(71) Applicant: ELECTRONICS AND TELECOMMUNICATIONS RESEARCH INSTITUTE, Daejeon (KR)

(72) Inventors: Yang-Seo Choi, Daejeon (KR); Jong-Hyun Kim, Daejeon (KR); Joo-Young Lee, Daejeon (KR); Sun-Oh Choi, Daejeon (KR); Ik-Kyun Kim, Daejeon (KR); Dae-Sung Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 185 days.

(21) Appl. No.: 15/331,436

(22) Filed: Oct. 21, 2016

(65) Prior Publication Data

US 2017/0237680 A1 Aug. 17, 2017

(30) Foreign Application Priority Data

Feb. 15, 2016 (KR) ........................ 10-2016-0016959

(51) Int. Cl.
*H04L 12/26* (2006.01)
*H04L 29/08* (2006.01)
(Continued)

(52) U.S. Cl.
CPC ............ *H04L 67/06* (2013.01); *H04L 43/026* (2013.01); *H04L 47/2483* (2013.01); *H04L 49/9057* (2013.01)

(58) Field of Classification Search
None
See application file for complete search history.

(56) References Cited

U.S. PATENT DOCUMENTS 6,789,116 B1 * 9/2004 Sarkissian ............... H04L 29/06 370/235
8,418,249 B1 * 4/2013 Nucci .................. G06F 21/552 706/20

(Continued)

FOREIGN PATENT DOCUMENTS

KR 10-2008-0102505 A 11/2008
KR 10-2015-0000986 A 1/2015

*Primary Examiner* — Ayaz R Sheikh
*Assistant Examiner* — Tarell A Hampton

(57) ABSTRACT

Disclosed are an apparatus and method for reconstructing a transmitted file with high performance in real time, which select analysis target packets for reconstruction by first checking using hardware whether data file-related information is present in packets transmitted via large-capacity traffic over a broadband network, and which reconstruct a file in real time only from the selected analysis target packets. The file reconstruction apparatus for reconstructing a data file from packets on a network includes a packet monitoring unit for extracting packets on the network, a collected packet selection unit for determining whether, for the extracted packets, each packet is a reconstruction target based on flow information, and selecting a reconstruction target packet, and a file reconstruction unit for performing file reconstruction by extracting data from the reconstruction target packet and by storing the extracted data as data of a reconstructed file in a relevant flow.

17 Claims, 9 Drawing Sheets

(51) Int. Cl.

| | |
|---|---|
| ***H04L 12/851*** | (2013.01) |
| ***H04L 12/861*** | (2013.01) |

(56) References Cited

U.S. PATENT DOCUMENTS

| | | | | |
|---|---|---|---|---|
| 9,094,288 | B1 * | 7/2015 | Nucci | H04L 43/026 |
| 2002/0054588 | A1 * | 5/2002 | Mehta | H04L 43/028 370/352 |
| 2004/0160899 | A1 * | 8/2004 | Lai | H04L 43/026 370/252 |
| 2007/0047457 | A1 * | 3/2007 | Harijono | H04L 49/90 370/250 |
| 2008/0133609 | A1 | 6/2008 | Lee et al. | |
| 2008/0291912 | A1 | 11/2008 | Choi et al. | |
| 2008/0307109 | A1 * | 12/2008 | Galloway | H04L 67/06 709/232 |
| 2009/0157896 | A1 | 6/2009 | Kim et al. | |
| 2009/0290492 | A1 * | 11/2009 | Wood | H04L 63/1416 370/235 |
| 2009/0290501 | A1 * | 11/2009 | Levy | H04L 49/70 370/250 |
| 2010/0287227 | A1 * | 11/2010 | Goel | H04L 67/1002 709/202 |
| 2010/0325429 | A1 * | 12/2010 | Saha | H04L 63/0823 713/158 |
| 2014/0280813 | A1 * | 9/2014 | Ramachandran | H04L 67/14 709/223 |
| 2015/0006595 | A1 | 1/2015 | Choi et al. | |

* cited by examiner

| SORT | FILE TYPE | SIGNATURE |
|---|---|---|
| EXECUTABLE FILES | PE | 0x5A4D |
| | ELF | 0x464C457F |
| | APK | 0x4034B50 |
| | JAR | 0x4034B50 |
| IMAGE FILES | JPG | 0xD8FF |
| | GIF | 0x464947 |
| ZIP FILE | ZIP | 0x4034B50 |
| DOCUMENT FILES | PDF | 0x2D46445025 |
| | PPTX | 0x4034B50 |
| | DOCX | 0x4034B50 |
| | XLSX | 0x4034B50 |
| | DOC | 0xE11AB1A1E011CFD0 |
| | PPT | 0xE11AB1A1E011CFD0 |
| | XLS | 0xE11AB1A1E011CFD0 |

FIG. 4

| SORT | FILE TYPE | VERIFICATION SIGNATURE |
|---|---|---|
| EXECUTABLE FILES | PE | 0x5A4D |
| | ELF | |
| | APK | 0x4034B50 |
| | JAR | 0x4034B50 |
| IMAGE FILES | JPG | |
| | GIF | |
| ZIP FILE | ZIP | 0x4034B50 |
| DOCUMENT FILES | PDF | 0x2D46445025 |
| | PPTX | 0x4034B50 |
| | DOCX | 0x4034B50 |
| | XLSX | 0x4034B50 |
| | DOC | |
| | PPT | |
| | XLS | |

FIG. 8

APPARATUS AND METHOD FOR RECONSTRUCTING TRANSMITTED FILE IN REAL TIME FOR BROADBAND NETWORK ENVIRONMENT

CROSS REFERENCE TO RELATED APPLICATION

This application claims the benefit of Korean Patent Application No. 10-2016-0016959, filed Feb. 15, 2016, which is hereby incorporated by reference in its entirety into this application.

BACKGROUND OF THE INVENTION

1. Technical Field

The present invention generally relates to a file reconstruction apparatus and method and, more particularly, to an apparatus and method for extracting and reconstructing, in real time, a data file from packets that are transmitted over a broadband network.

2. Description of the Related Art

Conventional file reconstruction technology is configured to check whether a specific file is present in network packets, which are collected over a network and are then stored, and to reconstruct the specific file using software if the specific file is present in the network packets.

In this case, there is a disadvantage in that, to perform file reconstruction, all network traffic must be continuously collected and stored in a designated storage device. Further, problems arise in that the amount of traffic to be collected over a recent high-performance and broadband network is very large, and thus a huge storage space is required to store all packets, and in that stored traffic is loaded and a file is reconstructed from the loaded traffic using software, and thus it takes a very long time for the transmitted file to be checked.

SUMMARY OF THE INVENTION

Accordingly, the present invention has been made keeping in mind the above problems occurring in the prior art, and an object of the present invention is to provide an apparatus and method for reconstructing a transmitted file with high performance in real time, which select analysis target packets for reconstruction by first checking using hardware whether data file-related information is present in packets that are transmitted via large-capacity traffic over a broadband network, and which reconstruct a file in real time only from the selected analysis target packets.

Objects of the present invention are not limited to the above-described object and other objects that are not described here will be clearly understood by those skilled in the art from the following description.

In accordance with an aspect of the present invention to accomplish the above object, there is provided a file reconstruction apparatus for reconstructing a data file from packets on a network, including a packet monitoring unit for extracting packets on the network; a collected packet selection unit for determining whether, for the extracted packets, each extracted packet is a reconstruction target based on flow information, and selecting a reconstruction target packet; and a file reconstruction unit for performing file reconstruction by extracting data from the reconstruction target packet and by storing the extracted data as data of a reconstructed file in a relevant flow.

The collected packet selection unit may include flow information storage; and a flow information checking and management unit for delivering a reconstruction target packet, for which flow information identical to flow information extracted from the packet extracted by the packet monitoring unit is present in the storage, to the file reconstruction unit.

The collected packet selection unit may further include a file signature verification unit for verifying whether a signature for a collection target file type is present in the packet extracted by the packet monitoring unit if flow information identical to the flow information extracted from the packet extracted by the packet monitoring unit is not present in the storage, and the flow information checking and management unit may be configured to store flow information and file type information of the packet that is a new reconstruction target, for which the signature for the collection target file type is present, in the storage, and to deliver the packet that is the new reconstruction target to the file reconstruction unit.

The flow information checking and management unit may be configured to, when the packet extracted by the packet monitoring unit is a packet for terminating the relevant flow, delete the flow information stored in the storage.

The flow information checking and management unit may check a duration of the flow information in the storage and delete the flow information stored in the storage when a packet in the relevant flow is not received for a predetermined period of time.

The file reconstruction unit may include multiple CPU cores; and a packet distribution unit for individually distributing flows, which are received from the collected packet selection unit and include the reconstruction target packet, to the multiple CPU cores, wherein each of the CPU cores independently performs file reconstruction.

Each of the multiple CPU cores may include a flow information checking unit for checking flow information of each reconstruction target packet and determining whether the reconstruction target packet belongs to a flow in which a file is currently being reconstructed; an Internet Protocol (IP) fragmentation processing unit for, when the reconstruction target packet belongs to the flow in which the file is currently being reconstructed, aggregating pieces of IP-fragmented data that are included in the reconstruction target packet; a Transmission Control Protocol (TCP) reassembly processing unit for performing a TCP reassembly procedure on the pieces of IP-fragmented data; and a file data addition unit for extracting data of the reconstruction target packet on which the TCP reassembly procedure has been completed, and reconstructing the file that is currently being reconstructed so that the extracted data is added to the file that is currently being reconstructed up to a final location based on a file size or a file termination location signature.

Each of the CPU cores may further include a new file generation unit for, when the reconstruction target packet does not belong to the flow in which the file is currently being reconstructed, generating a new reconstructed file for the flow and storing data of the packet in a storage unit to correspond to the new reconstructed file.

The new file generation unit may perform a file type verification procedure for reading the data of the packet in a specific file type and for verifying whether the packet substantially matches a file of the specific file type, and then determine whether to ignore the packet. Further, the new file generation unit may determine whether a preset verification signature is present in the packet to perform the file type verification procedure.

In accordance with another aspect of the present invention to accomplish the above object, there is provided a file reconstruction method for reconstructing a data file from packets on a network, including extracting packets on the network; determining whether, for the extracted packets, each extracted packet is a reconstruction target based on flow information, and then selecting a reconstruction target packet; and performing file reconstruction by extracting data from the reconstruction target packet and by storing the extracted data as data of a reconstructed file in a relevant flow.

Selecting the reconstruction target packet may include storing the flow information in storage; and determining a packet, for which flow information identical to flow information extracted from the extracted packet is present in the storage, to be the reconstruction target packet.

Selecting the reconstruction target packet may further include verifying whether a signature for a collection target file type is present in the extracted packet if flow information identical to the flow information extracted from the extracted packet is not present in the storage; and determining the packet, for which the signature for the collection target file type is present, to be a new reconstruction target, and storing flow information and file type information of the packet in the storage.

Determining the packet to be reconstruction target packet may be configured to, when the extracted packet is a packet for terminating the relevant flow, delete the flow information stored in the storage.

Determining the packet to be reconstruction target packet may be configured to check a duration of the flow information stored in the storage and delete the flow information stored in the storage when a packet in the relevant flow is not received for a predetermined period of time.

Performing the file reconstruction may include individually distributing flows including the reconstruction target packet to multiple CPU cores; and independently performing, by each of the CPU cores, the file reconstruction.

Independently performing, by each of the CPU cores, the file reconstruction may include checking flow information of each reconstruction target packet and determining whether the reconstruction target packet belongs to a flow in which a file is currently being reconstructed; when the reconstruction target packet belongs to the flow in which the file is currently being reconstructed, aggregating pieces of IP-fragmented data that are included in the reconstruction target packet; performing a Transmission Control Protocol (TCP) reassembly procedure on the pieces of IP-fragmented data; and extracting data of the reconstruction target packet on which the TCP reassembly procedure has been completed, and reconstructing the file that is currently being reconstructed so that the extracted data is added to the file that is currently being reconstructed up to a final location based on a file size or a file termination location signature.

Independently performing, by each of the CPU cores, the file reconstruction may further include when the reconstruction target packet does not belong to the flow in which the file is currently being reconstructed, generating a new reconstructed file for the flow, and storing data of the packet in a storage unit to correspond to the new reconstructed file.

Independently performing, by each of the CPU cores, the file reconstruction may further include performing a file type verification procedure for reading the data of the packet in a specific file type and for verifying whether the packet substantially matches a file of the specific file type, and then determining whether to ignore the packet. Further, whether a preset verification signature is present in the packet may be determined to perform the file type verification procedure.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram illustrating examples of the types of files that are involved in reconstruction and signatures thereof according to an embodiment of the present invention;

FIG. 8 is a diagram illustrating examples of the types of files that are involved in reconstruction and signatures for verification according to an embodiment of the present invention.

DESCRIPTION OF THE PREFERRED EMBODIMENTS

Figure 1:
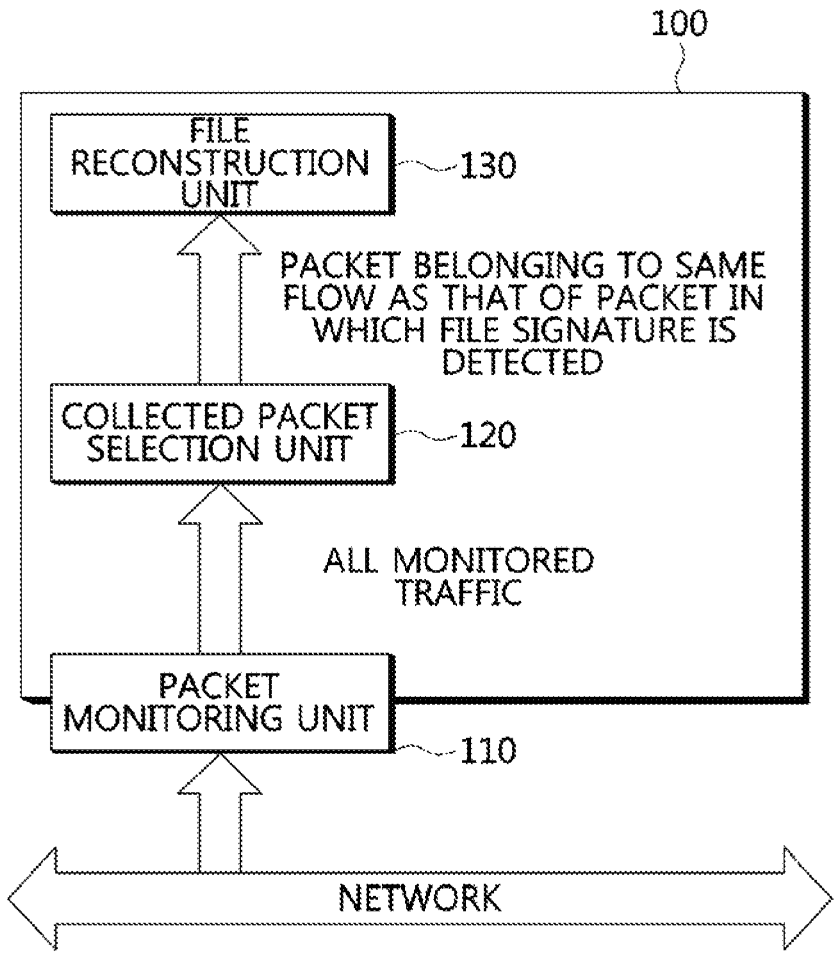
FIG. 1 is a configuration diagram showing a file reconstruction apparatus according to an embodiment of the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not to be interpreted as having ideal or excessively formal meanings unless they are definitely defined in the present specification.

Recently, as infringement incidents over a network frequently occur, efforts to extract information required for the analysis of such infringement incidents from network traffic have been continuously made. Here, one piece of very important information, among pieces of information extracted from network traffic, is related to who or which system has transmitted a file, which file has been transmitted, and to whom or which system the file has been transmitted. In order to check this information, technology for extracting files from network traffic has been developed. Technology developed to date adopts a scheme for reading previously collected network traffic, extracting a transmitted file from packets included in the network traffic, and then reconstructing the file. However, in order to reconstruct the file in this way, a procedure for collecting and storing the network traffic itself is required. For this procedure, a high-performance traffic storage system is required, and a huge storage space for storing a large amount of traffic must be provided. Further, since a file must be reconstructed using software by analyzing a large amount of network traffic, a lot of time is required for file reconstruction.

To solve this problem, the present invention proposes an apparatus and method for reconstructing a transmitted file with high performance in real time, which collect and reconstruct a file in real time without separately storing the network traffic.

FIG. 1 is a configuration diagram showing an apparatus 100 for reconstructing a file (hereinafter referred to as a 'file reconstruction apparatus 100') according to an embodiment of the present invention.

Referring to FIG. 1, the file reconstruction apparatus 100 according to the embodiment of the present invention is connected to a network and includes a packet monitoring unit 110, a collected packet selection unit 120, and a file reconstruction unit 130. Individual components of the file reconstruction apparatus 100 may be implemented using hardware such as a semiconductor processor, software such as an application program, or a combination thereof.

Here, the network may be a wired/wireless network for supporting wired Internet communication, wireless Internet communication such as WiFi or WiBro, mobile communication such as Wideband Code Division Multiple Access (WCDMA) or Long-Term Evolution (LTE), or wireless communication such as Wireless Access in Vehicular Environment (WAVE) communication.

The packet monitoring unit 110 is connected to the network and is configured to monitor traffic that is transmitted and received over the network and to extract packets. The packet monitoring unit 110 may extract network packets that are transmitted via traffic over the network using a Network Interface Card (NIC). The NIC may be either a typical general-purpose network card or a network card that is developed exclusively for this purpose. The network packets may be packets including various types of data files, such as digital multimedia data, control data, lookup data, or hacked data, which are transmitted and received by a server or a user terminal (e.g. a smart phone, a PC, a tablet PC, a Portable Multimedia Player (PMP), or the like).

The collected packet selection unit 120 determines whether, for all of the network packets extracted by the packet monitoring unit 110, each network packet must be reconstructed based on flow information, selects reconstruction target packets from among the extracted network packets, and delivers the selected reconstruction target packets to the file reconstruction unit 130.

The file reconstruction unit 130 performs file reconstruction by extracting data from the reconstruction target packets selected by the collected packet selection unit 120 and by storing the extracted data as data of a file to be reconstructed in a relevant flow. The file reconstruction unit 130 may perform file reconstruction by verifying whether a collection target file is actually present in the reconstruction target packets (verifying the file type), generating a reconstructed file if the collection target file is found to be actually present, and storing the data extracted from the reconstruction target packets as data of the reconstructed file.

Figure 2:
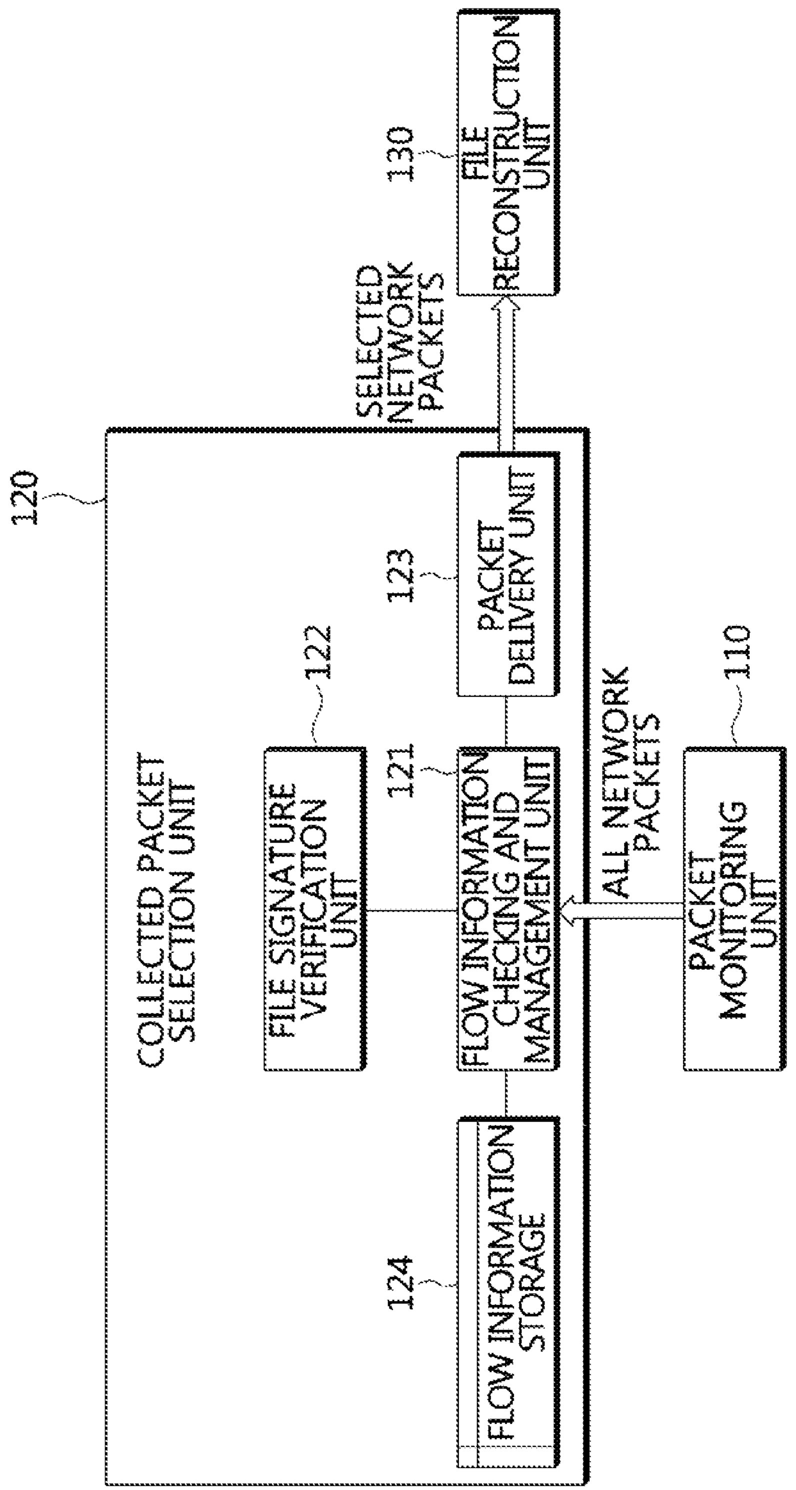
FIG. 2 is a block diagram for explaining in detail the collected packet selection unit of FIG. 1.

FIG. 2 is a block diagram for explaining in detail the collected packet selection unit 120 of FIG. 1.

Referring to FIG. 2, the collected packet selection unit 120 includes a flow information checking and management unit 121, a file signature verification unit 122, a packet delivery unit 123, and flow information storage 124. The flow information checking and management unit 121 checks whether, for network packets, each network packet belongs to a flow that is currently being collected, based on flow information, and delivers the network packet as a selected reconstruction target packet to the file reconstruction unit 130 through a packet delivery unit 123 if the network packet belongs to the flow that is currently being collected. The file signature verification unit 122 verifies whether the network packet includes a file signature if the network packet does not belong to the flow that is currently being collected. The packet delivery unit 123 delivers the selected reconstruction target packet to the file reconstruction unit 130. The flow information storage 124 stores information about the flow that is currently being collected.

Figure 3:
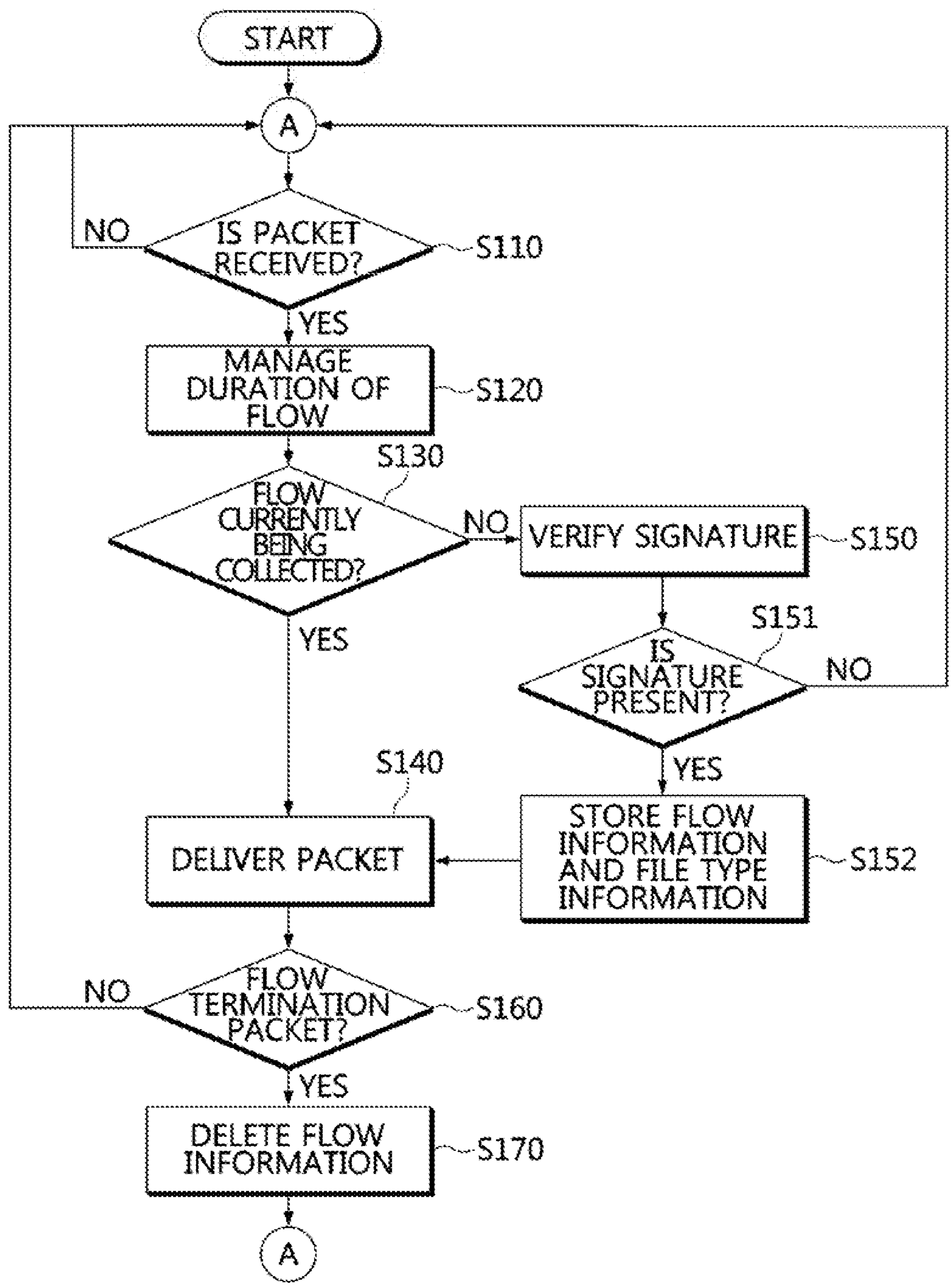
FIG. 3 is a flowchart for explaining the operation of the collected packet selection unit of FIG. 2.

FIG. 3 is a flowchart for explaining the operation of the collected packet selection unit 120 of FIG. 2.

First, when a network packet is delivered from the packet monitoring unit 110 at step S110, the flow information checking and management unit 121 extracts flow information, that is, 5-tuple information (composed of a source IP address, a destination IP address, a source port number, a destination port number, and protocol), from the network packet, and manages the duration (Time To Live: TTL) of the flow information (e.g. the time at which the latest packet in the relevant flow arrived, or the like) in the flow information storage 124 at step S120.

If flow information identical to the flow information extracted from the network packet that has been delivered from the packet monitoring unit 110 is present in the flow information storage 124 at step S130, the flow information checking and management unit 121 delivers the network packet (i.e. the reconstruction target packet) to the file reconstruction unit 130 through the packet delivery unit 123 at step S140. Here, file type information of a file included in the reconstruction target packet, together with the reconstruction target packet, is delivered.

Further, when the network packet is a packet for terminating the flow at step S160, the flow information checking and management unit 121 determines that the flow has been terminated, and deletes the flow information, stored in the flow information storage 124, at step S170. In addition, the flow information checking and management unit 121 periodically checks the duration of the flow information in the flow information storage 124, and also checks the time at which the latest packet belonging to the flow arrived. Thereafter, if the packet of the flow has not been delivered for a time longer than a predefined flow duration, the flow information checking and management unit 121 determines that the flow has been terminated, and deletes the flow information from the flow information storage 124.

Meanwhile, if flow information identical to the flow information extracted from the network packet that has been delivered (i.e. the newly arrived network packet) is not stored in the flow information storage 124 at step S130, the flow information checking and management unit 121 delivers the newly arrived packet to the file signature verification unit 122. The file signature verification unit 122 verifies whether a signature for a collection target file type identical to a preset signature is present in the delivered packet (see FIG. 4) at step S150, and ignores the delivered packet if the signature is not present in the delivered packet. The signatures for collection target file types to be involved in reconstruction, such as those shown in FIG. 4, may be managed in a predetermined storage means, such as memory or a database (DB). The signatures illustrated in this way may be modified together as the type of file is modified. FIG. 4 merely illustrates examples of file types and signatures thereof, wherein the file types and signatures of the present invention are not limited to the illustrated file types and signatures, but may be further expanded or contracted and then applied as needed.

When the signature is present in the delivered packet at step S151, the file signature verification unit 122 sends the results of verification of the presence of the signature as a response to the flow information checking and management unit 121. The file signature verification unit 122 may use a fast pattern matching scheme to verify whether a signature for the collection target file type is present in the network packet. When the fast pattern matching scheme used in Deep Packet Inspection (DPI) technology is exploited, an Intrusion Detection System (IDS) or an Intrusion Prevention System (IPS) may generally search for several thousands of attack detection signatures in real time, and thus it is possible to verify in real time whether a signature for a previously selected file type is present.

The flow information checking and management unit 121, having received the results of verifying whether the signature is present from the file signature verification unit 122, records the flow information and file type information of the corresponding packet in the flow information storage 124 at step S152, and delivers the packet as a new reconstruction target packet to the file reconstruction unit 130 through the packet delivery unit 123 at step S140.

Figure 5:
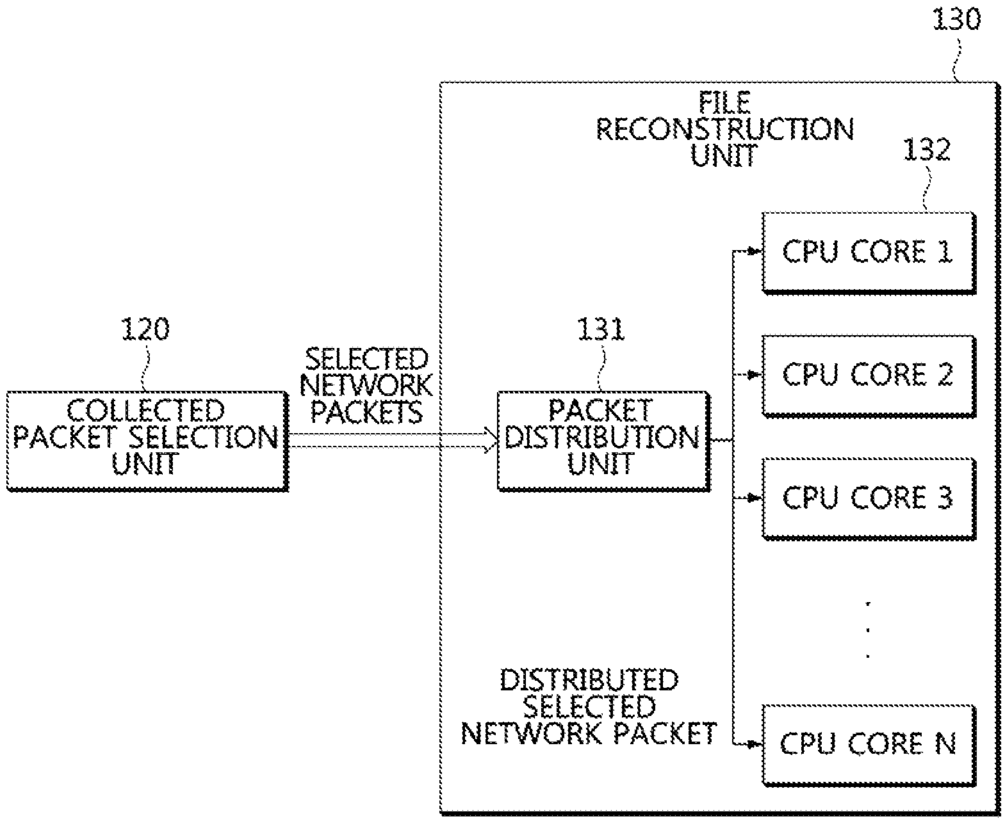
FIG. 5 is a block diagram for explaining in detail the file reconstruction unit of FIG. 1.

FIG. 5 is a block diagram for explaining in detail the file reconstruction unit 130 of FIG. 1.

Referring to FIG. 5, the file reconstruction unit 130 includes a packet distribution unit 131 and N (where N is a natural number equal to or greater than 2) Central Processing Unit (CPU) cores 132 so as to receive reconstruction target packets from the collected packet selection unit 120 and reconstruct a file from the packets.

The packet distribution unit 131 distributes flows including reconstruction target packets received from the collected packet selection unit 120 to the CPU cores 132. The packet distribution unit 131 may appropriately distribute the flows to individual CPU cores 132 using technology such as Intel's Really Simple Syndication (RSS).

To maximize file reconstruction performance, the flows may be distributed to individual CPU cores 132 using a technique such as multi-core programming, and each of the CPU cores 132 may reconstruct a file independently of other CPU cores. Each of the CPU cores 132 verifies whether a collection target file is actually present in the reconstruction target packets of the flow distributed thereto, and reconstructs the file from the packets if it is verified that the collection target file is present.

Figure 6:
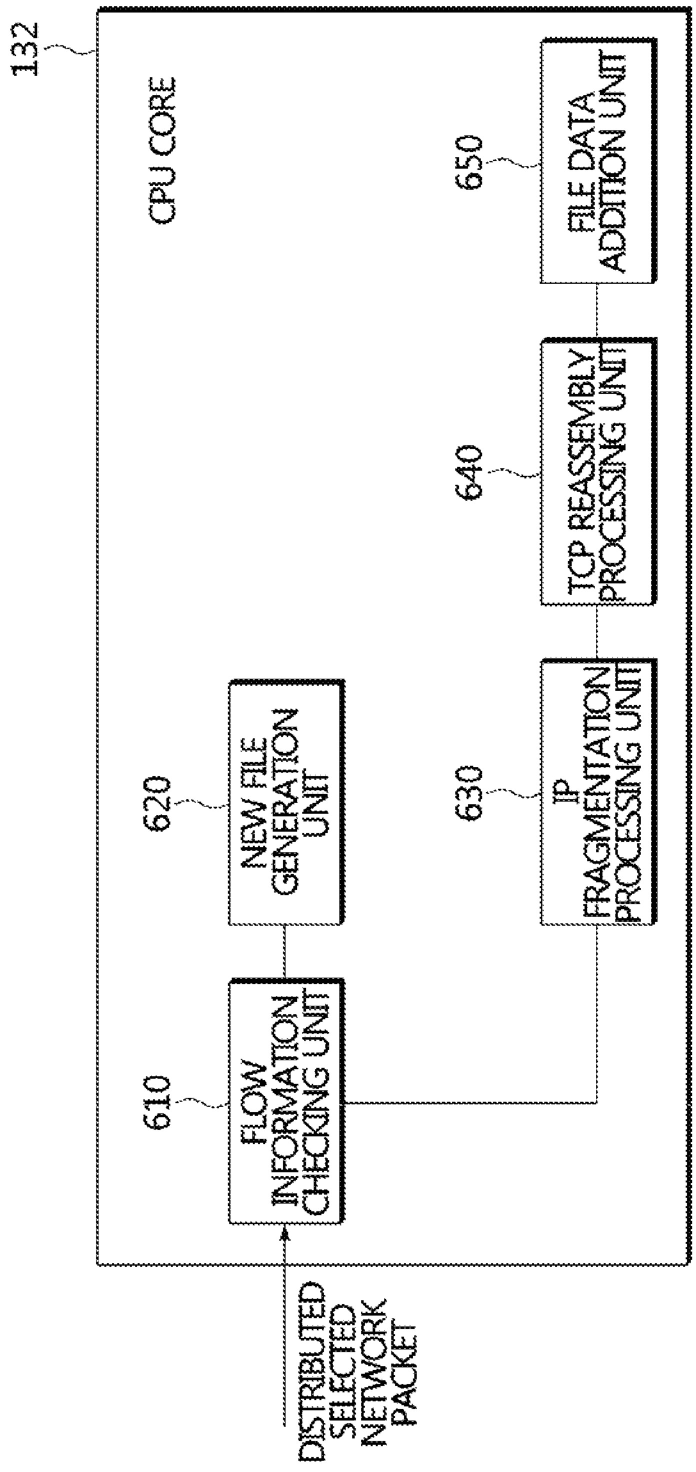
FIG. 6 is a block diagram for explaining in detail the CPU core of FIG. 5.

FIG. 6 is a block diagram for explaining in detail each CPU core 132 of FIG. 5.

Referring to FIG. 6, the CPU core 132 includes a flow information checking unit 610, a new file generation unit 620, an Internet Protocol (IP) fragmentation processing unit 630, a Transmission Control Protocol (TCP) reassembly processing unit 640, and a file data addition unit 650.

Figure 7:
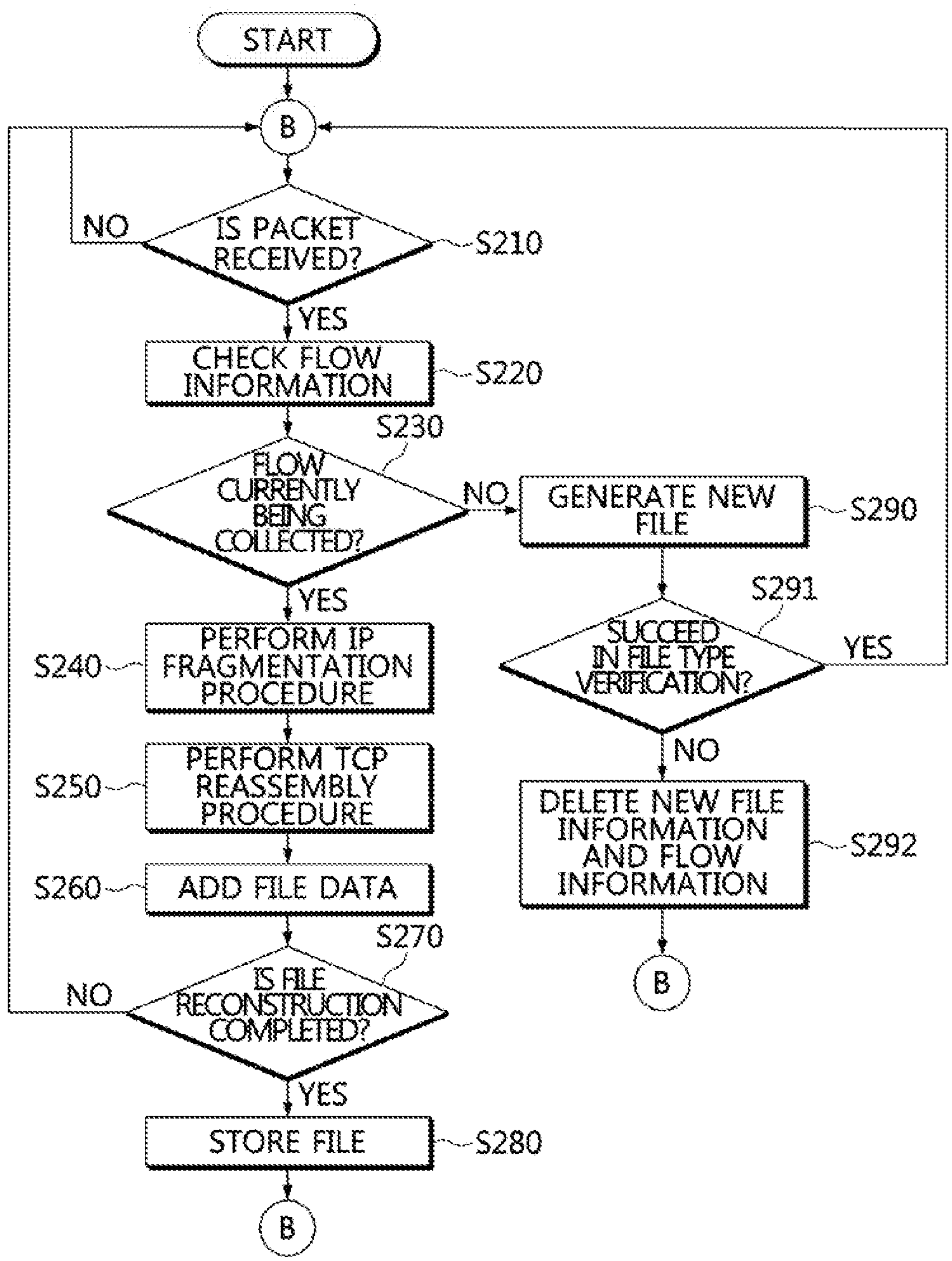
FIG. 7 is a flowchart for explaining the operation of the CPU core of FIG. 6.

FIG. 7 is a flowchart for explaining the operation of the CPU core 132 of FIG. 6.

First, when the reconstruction target packet of a relevant distributed flow is received at step S210, the flow information checking unit 610 checks the flow information of the target packet at step S220, and determines whether the reconstruction target packet belongs to the flow that is currently being collected, that is, whether a file is currently being reconstructed using packets belonging to the flow, or whether the packet belongs to a new flow at step S230.

If the reconstruction target packet belongs to the flow in which the file is currently being reconstructed at step S230, the IP fragmentation processing unit 630 performs a preprocessing procedure such as aggregation for TCP reassembly on the packet that includes distributed data, obtained by IP-fragmenting file data on a predetermined transmission unit basis, at step S240. The TCP reassembly processing unit 640 performs a TCP reassembly procedure on pieces of IP-fragmented data at step S250, and the file data addition unit 650 attempts to perform a file reconstruction procedure on the packet at step S260.

The file data addition unit 650 extracts data of the corresponding packet on which the TCP reassembly procedure has been completed and reconstructs the file so that the extracted data is added to the file that is currently being reconstructed. The file data addition unit 650 may calculate the location relationship between the extracted data and the content of the file that is currently being reconstructed, record the extracted data at an accurate location, and store the extracted data in a storage means such as memory.

When reconstruction of the file that is currently being reconstructed has been completed up to the final location, that is, the final location based on a file size or a file termination location signature, at step S270, the reconstruction procedure for adding the extracted data to the file that is currently being reconstructed for the relevant flow and storing the file is completed at step S280.

When it is determined that the reconstruction target packet received by the flow information checking unit 610 is a packet belonging to a new flow that does not correspond to the flow in which the file is currently being reconstructed at step S230, the new file generation unit 620 generates a new reconstructed file to start file reconstruction using the new flow and stores the data present in the payload area of the packet in the storage means such as the memory at step S290. However, the new file generation unit 620 may additionally perform a file type verification procedure for reading the data present in the payload area of the packet in a specific file type (format) and for verifying whether the packet substantially matches a file of the specific file type at step S291. If the packet does not match the file of the specific file type, the new file generation unit 620 ignores the received packet and deletes both information of the newly reconstructed file and the file information stored in the flow information storage 124 at step S292. Here, the file type verification procedure performed by the new file generation unit 620 may be implemented using a scheme for integrating pieces of data included in multiple packets that are sequentially collected, attempting to parse the integrated data in a specific file type designated as the target, extracting predetermined specific information (e.g. the verification signature of FIG. 8), determining whether the extracted specific information is accurate, and then finally verifying whether each of the packets matches the specific file type, rather than a simple signature comparison scheme performed by the collected packet selection unit 120.

For example, the new file generation unit 620 may determine whether a verification signature identical to a predesignated signature, such as that shown in FIG. 8, is present in the packet so as to verify the file type. However, since there are cases where a verification signature is not present according to the file type, file type verification may be performed only on files having a verification signature when the verification signature is used.

Figure 9:
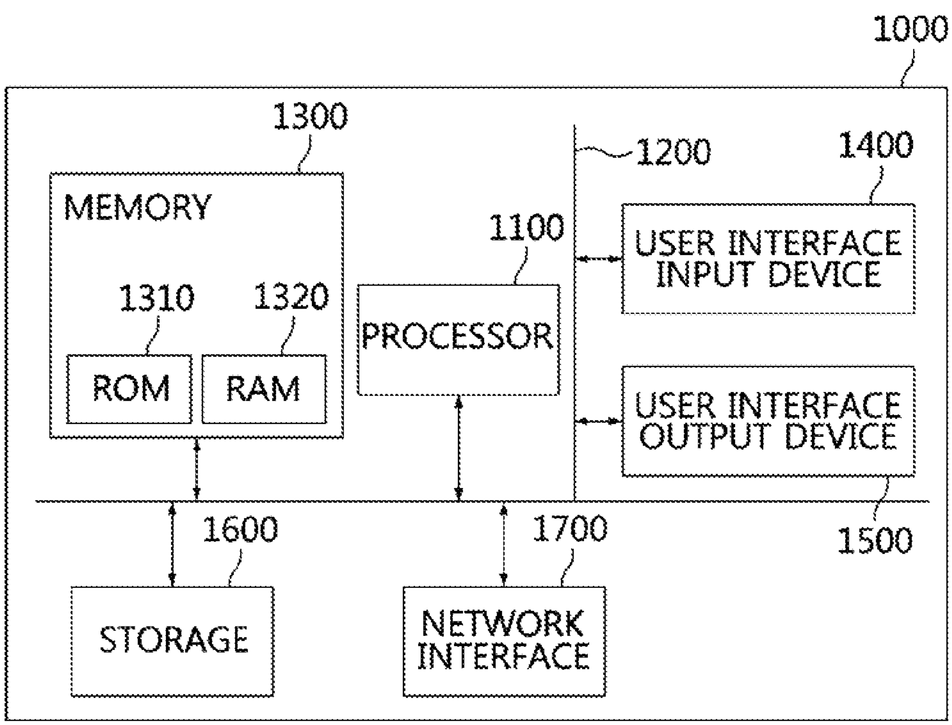
FIG. 9 is a diagram for explaining an example of a method for implementing the file reconstruction apparatus according to an embodiment of the present invention.

FIG. 9 is a diagram for explaining an example of a method for implementing the file reconstruction apparatus 100 according to the embodiment of the present invention. The file reconstruction apparatus 100 according to the embodiment of the present invention may be implemented using hardware, software or a combination thereof. For example, the file reconstruction apparatus 100 may be implemented as a computing system 1000, such as that shown in FIG. 9.

The computing system 100 may include at least one processor 1100, memory 1300, a user interface input device 1400, a user interface output device 1500, storage 1600, and a network interface 1700, which are connected to each other through a bus 1200. The processor 1100 may be either a CPU or a semiconductor device for executing the processing of instructions stored in the memory 1300 and/or the storage 1600. Each of the memory 1300 and the storage 1600 may include any of various types of volatile or nonvolatile storage media. For example, the memory 1300 may include Read Only Memory (ROM) 1310 and Random Access Memory (RAM) 1320.

Therefore, steps of the method or the algorithm described in relation with the embodiments disclosed in the present specification may be directly implemented by a hardware module or a software module that is executed by the processor 1100 or by a combination of the two modules. The software module may reside in a storage medium (i.e. the memory 1300 and/or the storage 1600), such as RAM, flash memory, ROM, Erasable Programmable ROM (EPROM), Electrically Erasable Programmable ROM (EEPROM), a register, a hard disk, a removable disk, or a Compact Disk (CD)-ROM. An exemplary storage medium may be coupled to the processor 1100, and the processor 1100 may read information from the storage medium and write information to the storage medium. Alternatively, the storage medium may be integrated with the processor 1100. The processor and the storage medium may also reside in an Application-Specific Integrated Circuit (ASIC). The ASIC may reside in a user terminal. Alternatively, the processor and the storage medium may reside as individual components in the user terminal.

As described above, the real-time transmitted file reconstruction apparatus 100 according to the present invention is advantageous in that it is possible to collect and monitor, in real time, transmitted files in packets that are transmitted via large-capacity traffic over a broadband network, and reconstructs the transmitted files, thus greatly shortening the time required for file collection and enabling the transmitted files to be rapidly verified thanks to the real-time collection of files, and in that there is no need to separately store a large amount of network traffic to perform file reconstruction, thus remarkably reducing the storage space required for file reconstruction.

In accordance with the real-time transmitted file reconstruction apparatus and method according to the present invention, it is possible to collect and monitor, in real time, transmitted files in packets that are transmitted via large-capacity traffic over a broadband network, and reconstructs the transmitted files, thus greatly shortening the time required for file collection and enabling the transmitted files to be rapidly verified thanks to the real-time collection of files. Further, there is no need to separately store a large amount of network traffic to perform file reconstruction, thus remarkably reducing the storage space required for file reconstruction.

Although the preferred embodiments of the present invention have been disclosed for illustrative purposes, those skilled in the art will appreciate that various modifications and changes are possible, without departing from the essential features of the invention as disclosed in the accompanying claims.

Therefore, the embodiments disclosed in the present invention are not intended to limit the technical spirit of the present invention and are merely intended to describe the invention, and the scope of the technical spirit of the present invention is not limited by those embodiments. The protection scope of the present invention should be defined by the accompanying claims, and all technical spirit of the accompanying claims and equivalents thereof should be construed as being included in the scope of the present invention.

What is claimed is:

1. A file reconstruction apparatus for reconstructing a data file from packets on a network, comprising:
- a packet monitoring unit extracting, using a processor, packets on the network;
- a collected packet selection unit determining, using a processor, whether, for the extracted packets, each extracted packet is a reconstruction target based on flow information, and selecting a reconstruction target packet; and
- a file reconstruction unit performing, using a processor, file reconstruction by extracting data from the reconstruction target packet and by storing the extracted data as data of a reconstructed file in a specific flow, wherein the collected packet selection unit comprises:
- flow information storage;
- a flow information checking and management unit delivering, using a processor, the reconstruction target packet if flow information identical to flow information extracted from the packet extracted by the packet monitoring unit is present in the storage, to the file reconstruction unit; and
- a file signature verification unit verifying, using a processor, whether a signature for a collection target file type is present in the packet extracted by the packet monitoring unit if flow information identical to the flow information extracted from the packet extracted by the packet monitoring unit is not present in the storage.

2. The file reconstruction apparatus of claim 1, wherein the flow information checking and management unit is configured to store flow information and file type information of the packet that is a new reconstruction target, for which the signature for the collection target file type is present, in the storage, and to deliver the packet that is the new reconstruction target to the file reconstruction unit.

3. The file reconstruction apparatus of claim 1, wherein the flow information checking and management unit is configured to, when the packet extracted by the packet monitoring unit is a packet for terminating the specific flow, delete the flow information stored in the storage.

4. The file reconstruction apparatus of claim 1, wherein the flow information checking and management unit checks a duration of the flow information in the storage and deletes the flow information stored in the storage when a packet in the specific flow is not received for a predetermined period of time.

5. The file reconstruction apparatus of claim 1, wherein the file reconstruction unit comprises:
multiple CPU cores; and
a packet distribution unit individually distributing, using a processor, flows, which are received from the collected packet selection unit and include the reconstruction target packet, to the multiple CPU cores, and
wherein each of the CPU cores independently performs file reconstruction.

6. The file reconstruction apparatus of claim 5, wherein each of the multiple CPU cores comprises:
a flow information checking unit checking, using a processor, flow information of each reconstruction target packet and determining whether the reconstruction target packet belongs to a flow in which a file is currently being reconstructed;
an Internet Protocol (IP) fragmentation processing unit, when the reconstruction target packet belongs to the flow in which the file is currently being reconstructed, aggregating, using a processor, pieces of IP-fragmented data that are included in the reconstruction target packet;
a Transmission Control Protocol (TCP) reassembly processing unit performing, using a processor, a TCP reassembly procedure on the pieces of IP-fragmented data; and
a file data addition unit extracting, using a processor, data of the reconstruction target packet on which the TCP reassembly procedure has been completed, and reconstructing, using a processor, the file that is currently being reconstructed so that the extracted data is added to the file that is currently being reconstructed up to a final location based on a file size or a file termination location signature.

7. The file reconstruction apparatus of claim 5, wherein each of the multiple CPU cores comprises:
a new file generation unit, when the reconstruction target packet does not belong to a flow in which a file is currently being reconstructed, generating, using a processor, a new reconstructed file for the flow and storing data of the packet in a storage unit to correspond to the new reconstructed file.

8. The file reconstruction apparatus of claim 7, wherein the new file generation unit performs a file type verification procedure for reading the data of the packet in a specific file type and for verifying whether the packet substantially matches a file of the specific file type, and then determines whether to ignore the packet.

9. The file reconstruction apparatus of claim 8, wherein the new file generation unit determines whether a preset verification signature is present in the packet to perform the file type verification procedure.

10. A file reconstruction method for reconstructing a data file from packets on a network, comprising:
extracting packets on the network;
determining whether, for the extracted packets, each extracted packet is a reconstruction target based on flow information, and then selecting a reconstruction target packet; and
performing file reconstruction by extracting data from the reconstruction target packet and by storing the extracted data as data of a reconstructed file in a specific flow,
wherein performing the file reconstruction comprises:
individually distributing flows including the reconstruction target packet to multiple CPU cores; and
independently performing, by each of the multiple CPU cores, the file reconstruction,
wherein independently performing the file reconstruction comprises:
checking flow information of each reconstruction target packet and determining whether the reconstruction target packet belongs to a flow in which a file is currently being reconstructed; and
when the reconstruction target packet does not belong to the flow in which the file is currently being reconstructed, generating a new reconstructed file for the flow, and storing data of the packet in a storage unit to correspond to the new reconstructed file.

11. The file reconstruction method of claim 10, wherein selecting the reconstruction target packet comprises:
storing the flow information in storage; and
determining a packet, for which flow information identical to flow information extracted from the extracted packet is present in the storage, to be the reconstruction target packet.

12. The file reconstruction method of claim 11, wherein selecting the reconstruction target packet further comprises:
verifying whether a signature for a collection target file type is present in the extracted packet if flow information identical to the flow information extracted from the extracted packet is not present in the storage; and
determining the packet, for which the signature for the collection target file type is present, to be a new reconstruction target, and storing flow information and file type information of the packet in the storage.

13. The file reconstruction method of claim 11, wherein determining the packet to be reconstruction target packet is configured to, when the extracted packet is a packet for terminating the specific flow, delete the flow information stored in the storage.

14. The file reconstruction method of claim 11, wherein determining the packet to be reconstruction target packet is configured to check a duration of the flow information stored in the storage and delete the flow information stored in the storage when a packet in the specific flow is not received for a predetermined period of time.

15. The file reconstruction method of claim 10, wherein independently performing, the file reconstruction further comprises:
when the reconstruction target packet belongs to the flow in which the file is currently being reconstructed, aggregating pieces of Internet Protocol (IP)-fragmented data that are included in the reconstruction target packet;
performing a Transmission Control Protocol (TCP) reassembly procedure on the pieces of IP-fragmented data; and
extracting data of the reconstruction target packet on which the TCP reassembly procedure has been completed, and reconstructing the file that is currently being reconstructed so that the extracted data is added to the file that is currently being reconstructed up to a final location based on a file size or a file termination location signature.

16. The file reconstruction method of claim 10, wherein independently performing the file reconstruction further comprises performing a file type verification procedure for reading the data of the packet in a specific file type and for verifying whether the packet substantially matches a file of the specific file type, and then determining whether to ignore the packet.

17. The file reconstruction method of claim 16, wherein whether a preset verification signature is present in the packet is determined to perform the file type verification procedure.

* * * * *